Jan. 3, 1956     O. MAYBRIER     2,729,462
SAFETY GUARD FOR A TRACTOR OPERATOR
Filed July 28, 1952     5 Sheets-Sheet 1
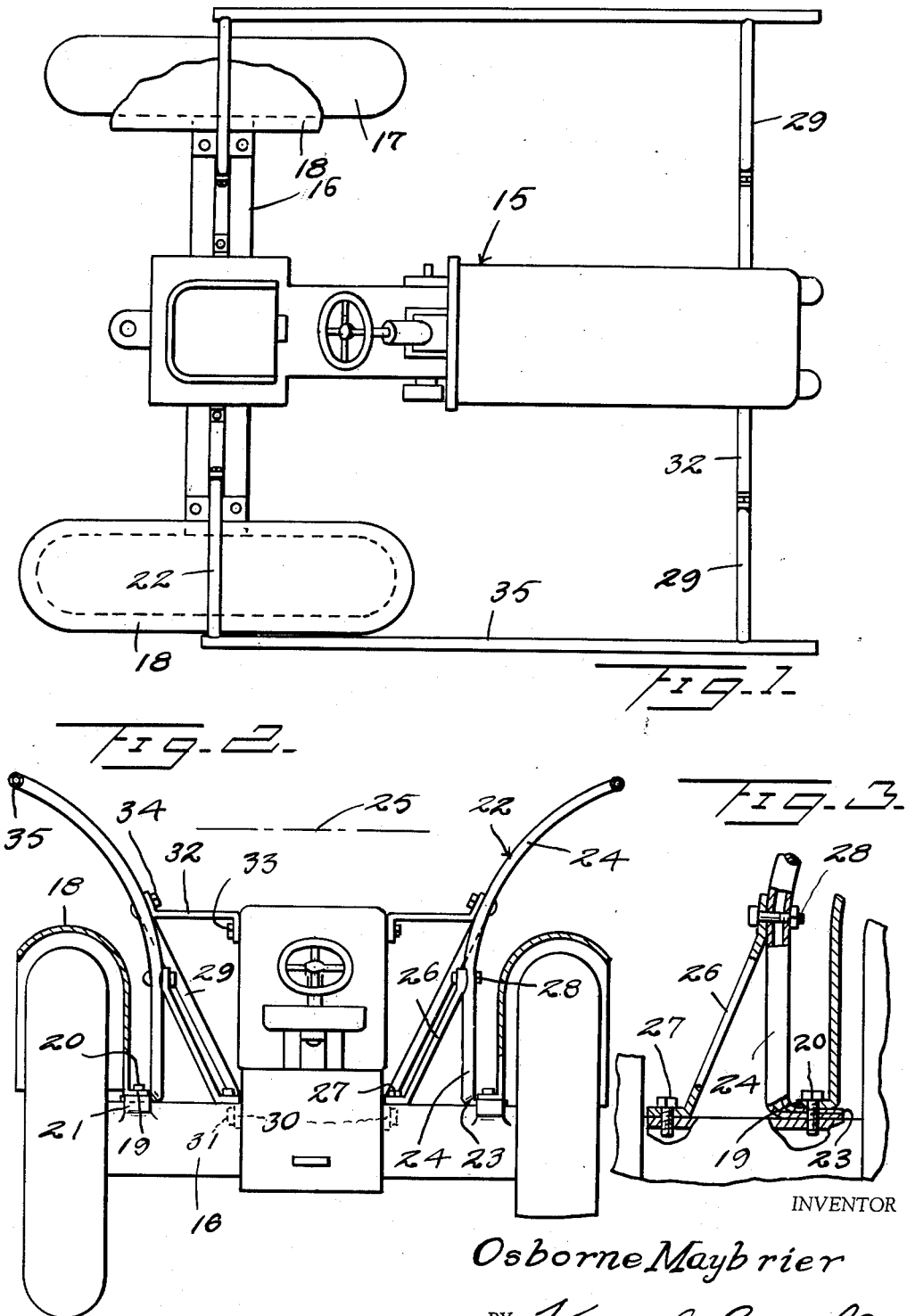
INVENTOR
Osborne Maybrier
BY Kimmel & Crowell
ATTORNEYS Jan. 3, 1956  O. MAYBRIER  2,729,462
SAFETY GUARD FOR A TRACTOR OPERATOR
Filed July 28, 1952  5 Sheets-Sheet 2
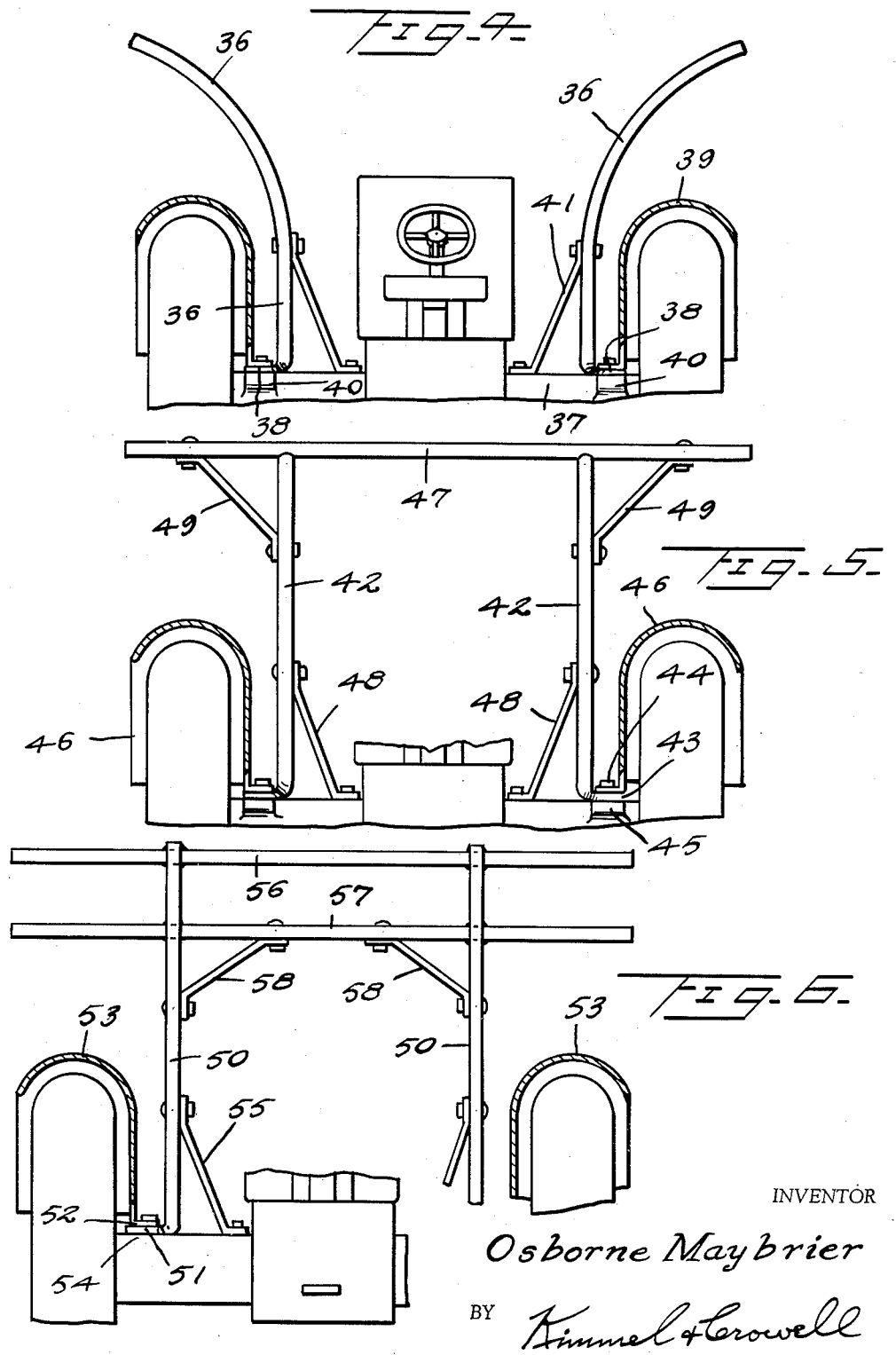
INVENTOR
Osborne Maybrier
BY Kimmel & Crowell
ATTORNEYS

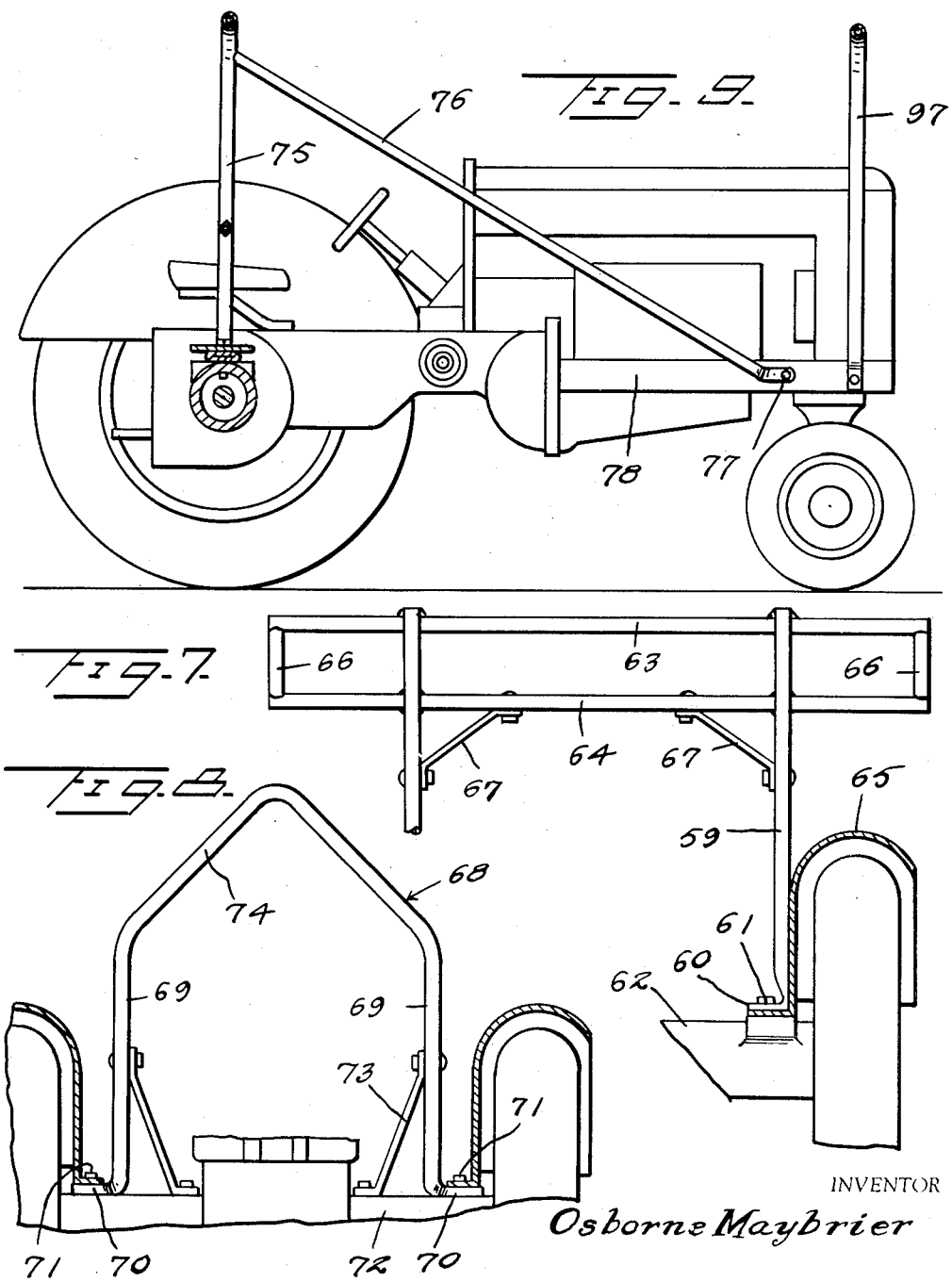

Jan. 3, 1956     O. MAYBRIER     2,729,462
SAFETY GUARD FOR A TRACTOR OPERATOR
Filed July 28, 1952     5 Sheets—Sheet 4
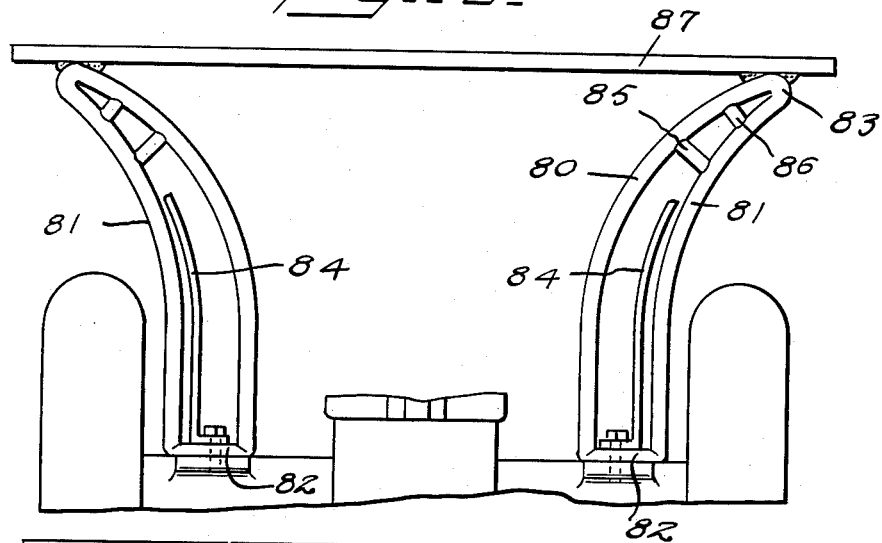
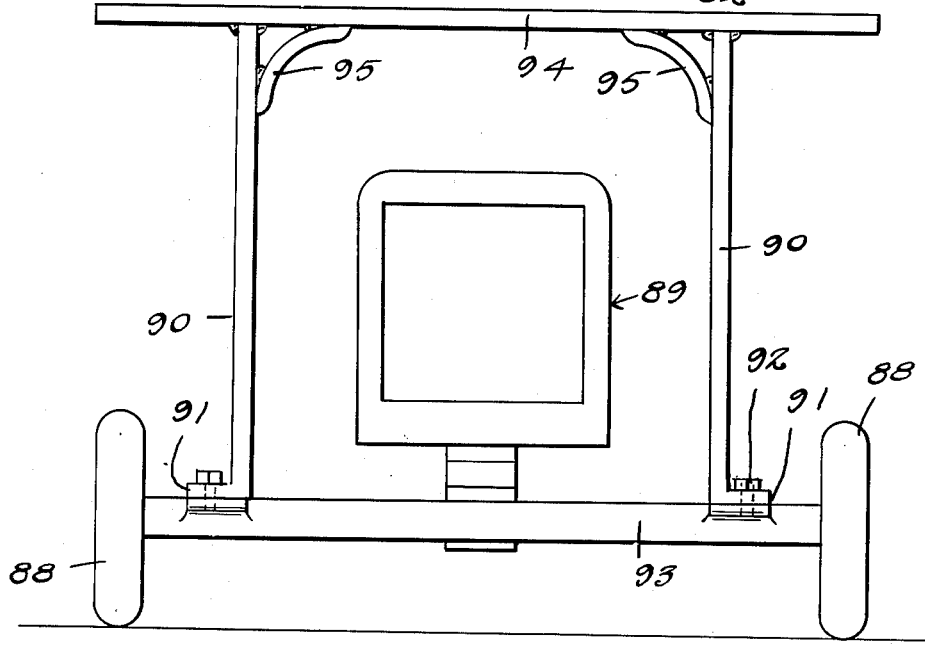
INVENTOR
Osborne Maybrier
BY Kimmel & Crowell
ATTORNEYS

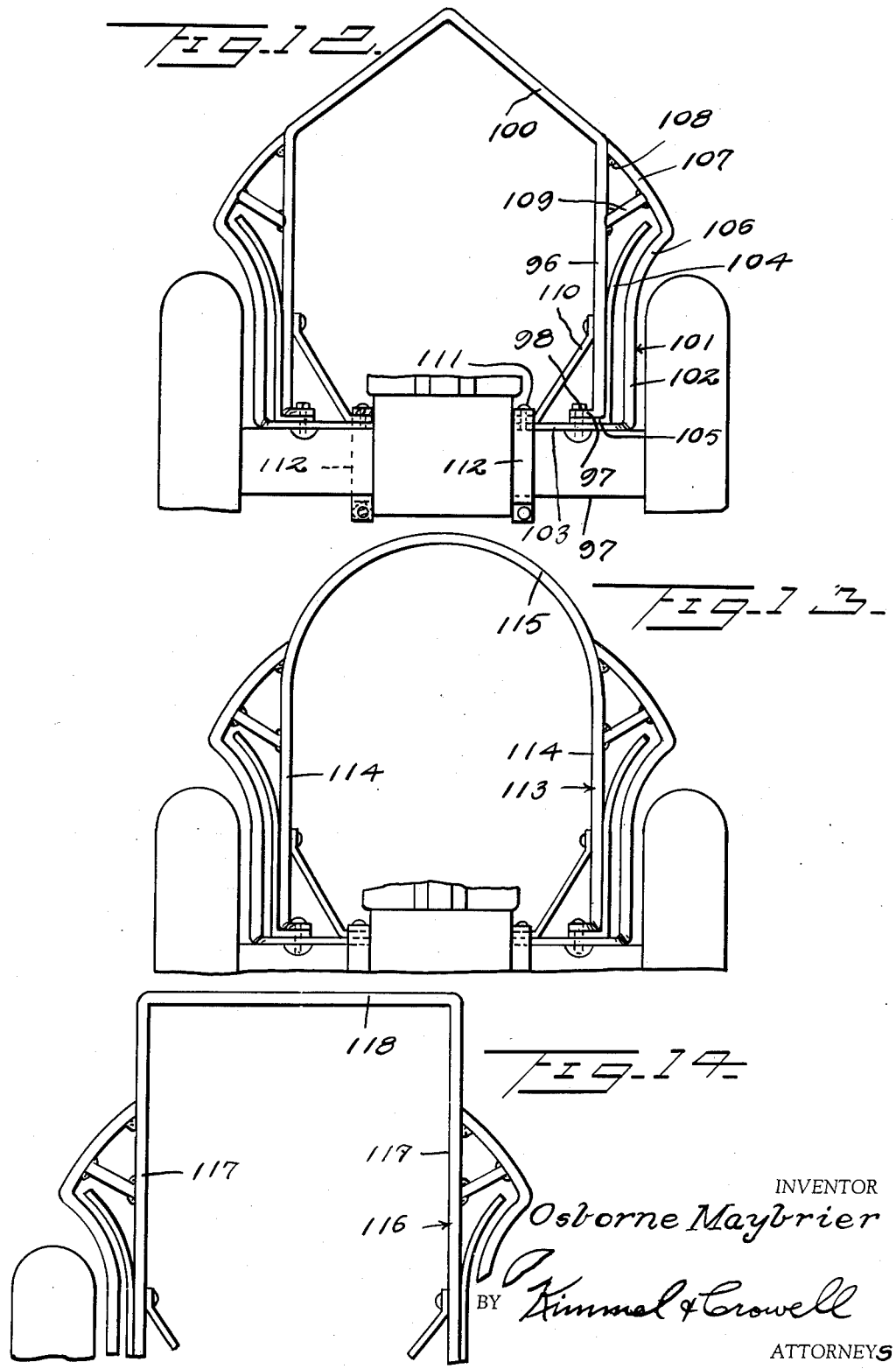

United States Patent Office 2,729,462
Patented Jan. 3, 1956

2,729,462

SAFETY GUARD FOR A TRACTOR OPERATOR

Osborne Maybrier, Cynthiana, Ky.

Application July 28, 1952, Serial No. 301,317

15 Claims. (Cl. 280—150)

This invention relates to a safety means for a tractor to protect the driver in the event the tractor tips over.

In the operation of a tractor, particularly about a hill or over ground having gulleys or deep furrows, it is not unusual for the tractor to tip or roll over sideways, and when this occurs the driver is frequently injured and the tractor damaged. It is, therefore, an object of this invention to provide a safety means in the form of an attachment which will serve as a guard for the driver in addition to preventing in many instances the tractor from rolling completely over.

A further object of this invention is to provide a safety guard means which can readily be adapted to various makes or types of tractors.

Another object of this invention is to provide a guard means for mounting on a tractor which will not interfere with the normal functions of the tractor or with any implements which may be coupled to the tractor.

With the above and other objects in view, my invention consists in the arrangement, combination and details of construction disclosed in the drawings and specification, and then more particularly pointed out in the appended claims.

In the drawings:

Figure 1 is a plan view partly broken away of a tractor having a guard constructed according to an embodiment of this invention mounted thereon, Figure 2 is a rear elevation partly in section of the tractor with the guard mounted thereon, Figure 3 is an enlarged fragmentary sectional view showing the rear guard mounting, Figure 4 is a fragmentary rear elevation partly in section of a modified form of this invention, Figure 5 is a fragmentary rear elevation partly in section of another modification of this invention, Figure 6 is a fragmentary rear elevation partly in section showing a further modification of this invention, Figure 7 is a fragmentary rear elevation partly in section of a further modification of this invention, Figure 8 is a fragmentary rear elevation partly in section of a further modification of this invention, Figure 9 is a detailed side elevation of a further modification of this invention, Figure 10 is a fragmentary rear elevation of a further modification of this invention, Figure 11 is a front elevation of a further modification of this invention, Figure 12 is a detailed rear elevation of a further modification of this invention, Figure 13 is a detailed rear elevation of another modification of this invention, Figure 14 is a fragmentary rear elevation of a further modification of this invention.

Referring to the drawings, and first to Figures 1, 2 and 3, the numeral 15 designates generally a conventional tractor having a rear axle housing 16, rear wheels 17, and rear fenders 18. The fenders 18 are normally formed with an inwardly projecting base flange 19 secured by fastening means 20 to a boss 21 formed on the rear axle housing 16.

In order to provide a means whereby the driver of the tractor 15 will be protected in the event the tractor should tip over, I have provided a pair of upwardly and outwardly extending guard bars 22 which are formed with right angular base members 23 interposed between the base flange 19 and the boss 21. The guard members 22 extend vertically upwardly, as indicated at 24, and are then bent outwardly on a relatively long arc, as indicated at 24, and terminate at a point above the normal height of the head of the driver, as indicated at 25.

The rear guard bars 22 are braced by means of upwardly and outwardly inclined bracing bars 26 secured, as at 27, to the axle housing 16 and secured, as at 28, to the guard member 22. There is a front pair of guard bars 29 which extend upwardly and outwardly from the front end of the tractor, and the front guard members 29 are formed with flattened vertically disposed lower ends 30 secured by fastening means 31 to one side of the vehicle chassis.

The front guard members 29 are braced by means of substantially horizontal bracing bars 32 which are secured, as at 33, to the engine or other portion of the tractor and are secured, as at 34 to the guard members 29. Preferably the front and rear guard members 22 and 29 are connected together at each side of the tractor by longitudinal connecting bars 35. Preferably the guard bars and the connecting bars are formed of tubular material which will resist bending.

Referring now to Figure 4, there is disclosed a modification of this invention wherein a pair of upwardly and outwardly extending guard bars 36 are secured to the axle housing 37 of the tractor and the bars 36 are formed with horizontal base portions 38 interposed between the fender 39 and the boss 40, which is formed on the axle housing 37. The guards bars 36 are of generally arcuate configuration with the concave side thereof outermost and are adapted to freely clear the fender 39 and terminate at their upper ends at a point above the head of the driver. The bars 36 are braced by means of upwardly and outwardly inclined bracing bars 41. The structure shown in Figure 4 is adapted to embody only a pair of guard bars which are disposed at the rear portion of the tractor on opposite sides of the driver's seat.

Referring now to Figure 5, there is disclosed another modification of this invenion embodying a pair of upright combined guard and supporting bars 42 which are formed with right angle base members 43 adapted to be secured by fastening means 44 to the boss 45, which is provided for the fender 46. The upright bars 42 have secured to the upper ends thereof an upper horizontal bar 47 which extends beyond the bars 42 and terminates at the opposite ends thereof substantially in the vertical plane of the outer edges of the fenders 46. The lower ends of the uprights 42 are braced by angled bracing bars 48, and the upper bar 47 is braced relative to the uprights 42 by means of upwardly and outwardly inclined bracing bars 49.

Referring now to Figure 6, there is disclosed another modification of this invention embodying a pair of upright bars 50 which are formed at their lower ends with base members 51 interposed between the base flange 52 of the fender 53 and the boss 54. The uprights 50 are braced by means of upwardly and outwardly inclined bracing bars 55, and the bars 50 are connected together at their upper ends by means of an upper connecting bar 56. A lower connecting bar 57 is secured to the uprights 50 in parallel relation to bar 56 and at a point slightly below the bar 56. A pair of angled bracing bars 58 are secured between lower bar 57 and upright bars 50.

Referring now to Figure 7, there is disclosed another modification of this invention embodying a pair of upright bars 59 which are formed with right angularly disposed lower ends 60 adapted to be secured by fastening means 61 to the axle housing 62. The bars 59 are connected together at their upper ends by an upper connecting bar 63 and a lower connecting bar 64 is secured to the bars 59 below bar 63. The two bars 63 and 64 project beyond the uprights 59 so as to overlie the fenders 65 and the outer ends of the bars 63 and 64 are connected together by means of vertical connecting bars 66. A pair of upwardly and inwardly projected bracing bars 67 are connected between the uprights 59 and the lower connecting bar 64.

Referring now to Figure 8, there is disclosed another modification of this invention embodying a substantially inverted V-shaped guard generally designated as 68. The guard 68 is formed with a pair of vertical members 69 having right angled lower ends 70 secured by fastening means 71 to the axle housing 72. The vertical bars 69 are braced by means of upwardly and outwardly inclined bracing bars 73. The upper ends of the vertical bars 69 are connected together by means of an inverted V-shaped member 74 which, in the present instance, is formed integral with the vertical bars 69. The inverted V-shaped guard member 68 forms a frame-like guard which extends over and about the driver of the tractor.

Referring now to Figure 9, there is disclosed another modification of this invention embodying a pair of rear guard members 75 which are similar to the guard members 36 in Figure 4. The guard members 75 are braced by means of downwardly and forwardly inclined bracing bars 76 which are secured at their upper rear ends to the bars 75 and are secured at their forward lower ends, as indicated at 77, to the frame 78 of the tractor. A pair of front guard bars 79 having a configuration similar to the guard members 36 are secured to the front end of the tractor.

Referring now to Figure 10, there is disclosed another modification of this invention embodying a pair of upwardly and outwardly curved guard bars 80 and 81 which are connected together at the lower ends by a base connecting member 82. The upper outer ends of the bars 81 are connected together by means of an arcuate connecting member 83. The bars 80 and 81 are adapted to be disposed on the inner and outer sides of a fender 84. The connected or integral guard members 80 and 81 are also connected together below their upper outer ends by means of bracing bars 85 and 86. A horizontal connecting bar 87 is connected between the guard members on each side of the vehicle.

Referring now to Figure 11, there is disclosed a further modification of this invention which is designed particularly for mounting on a tractor having relatively widely spaced front wheels 88. The front wheels 88 of the tractor 89 are in line with the rear wheels of the tractor. A pair of vertical bars 90 formed with right angled lower ends 91 are secured by fastening means 92 to the front axle 93. The upper ends of the bars 90 are connected together by means of an upper connecting bar 94, which also extends outwardly beyond the bars 90 and overlies the front wheels 88. A pair of bracing members 95 are connected between the upper portions of the vertical bars 90 and the upper bar 94.

The guard structure hereinbefore described is adapted to be mounted on a tractor in a position whereby the guard structure will not interfere with any of the operating elements of the tractor. Where a tractor is used on a side of a hill or other inclination, it frequently happens that the tractor will tip over sidewise and in numerous instances the driver is unable to escape injury; and in addition, the tractor is frequently badly damaged. With a guard structure as hereinbefore described mounted on the tractor, the latter will in most instances be held against complete turning over but if the tractor should turn completely over, the guard bars hereinbefore described will support the tractor, at least at the rear so that the driver will not be injured. This guard structure can be mounted on a tractor without interference with the present parts of the tractor and can be produced at relatively small cost.

Referring now to Figure 12 there is disclosed another modified form of guard structure which embodies a pair of vertically disposed bars 96, formed at their lower ends with inwardly extending base members 97 which are secured by fastening means 98 to the axle housing 99 of the tractor. The upright or vertical bars 96 are connected together at their upper ends by an inverted V-shaped member 100. An outer upwardly extending guard bar 101, having a lower vertical portion 102 is formed at its lower end with a horizontal base portion 103, and the base portion 103 is interposed between the base of the fender 104.

The fastening member 98 extends through the base 97, the base 105 of the fender and the base 103 of the outer guard member 102. The outer guard member 101 is formed at its upper portion with an outwardly curved member 106, and the upwardly and outwardly curved member 106 has a reversely curved and inwardly projecting extension 107 extending therefrom and secured by welding 108 to the upper end of a vertical guard bar 96.

A bracing bar 109 is secured between the extension 107 and the vertical bar 96. An angled bracing bar 110 is secured at one end to the upright 96, and is secured by fastening means 111 to the inner end of the base 103. A split clamping band 112 is secured to the bracing bar 110 by the fastening means 111 and engages about the axle housing 99.

Referring now to Figure 13, there is disclosed a guard structure generally designated as 113, which is substantially identical with the structure shown in Figure 12, with the exception that the upright guard bars 114 are connected together at their upper ends by a curved connecting bar 115. In other respects the structure shown in Figure 13 is similar to that shown in Figure 12.

Referring now to Figure 14, there is disclosed another modified form of guard structure 116 which is substantially identical with the guard structure shown in Figure 12, with the exception that the upright guard bars 117 are connected together at their upper ends by a horizontal connecting bar 118. In other respects the structure shown in Figure 14 is identical with that shown in Figure 12.

I do not mean to confine myself to the exact details of construction herein disclosed, but claim all variations falling within the purview of the appended claims.

What is claimed is:

1. In combination, a tractor having a driver's seat, a pair of upwardly extending guard members disposed one on each side of the seat and terminating at their upper ends above the head of the driver, and outwardly of and over the rear wheels of said tractor and means securing said guard members on the tractor.

2. In combination, a tractor having a driver's seat, a pair of upwardly extending guard members disposed one on each side of the seat and terminating at their upper ends above the head of the driver, means securing said guard members on the tractor, said guard members being upwardly and outwardly curved whereby their upper ends will extend over the rear wheels of the tractor.

3. In combination, a tractor having a driver's seat, a pair of upwardly extending guard members disposed one on each side of the seat and terminating at their upper ends above the head of the driver, a pair of upwardly and outwardly extending front guard members, means securing the lower ends of said guard members to the tractor, and a pair of connecting bars fixed to said front guard members and to said first named guard members.

4. In combination, a tractor having a driver's seat, a pair of upwardly extending guard members disposed one on each side of the seat and terminating at their upper ends above the head of the driver and upwardly and outwardly over the wheels of said tractor, means securing said guard members on the tractor, and means fixedly bracing said guard members relative to the tractor.

5. A guard means for mounting on a tractor on opposite sides of the driver's seat, comprising a pair of upwardly and outwardly extending bars, means securing the lower ends of said bars on the tractor, and a bracing bar fixed to each of said first named bars for attachment to the tractor.

6. A guard attachment for mounting on a tractor having a driver's seat comprising a rear pair of upwardly and outwardly directed bars one on each side of said seat, a front pair of upwardly and outwardly directed bars, and a pair of connecting bars connected between said front and rear bars.

7. A guard attachment for mounting on a tractor having a driver's seat to protect the driver against injury in the event the tractor should tip over, said attachment comprising a pair of upwardly and outwardly directed bars one on each side of said seat, and a bracing bar fixed to each of said pair of bars adapted for securing to the tractor.

8. A guard attachment for mounting on a tractor having a driver's seat to protect the driver against injury in the event the tractor should tip over, said attachment comprising a pair of upright bars one on each side of said seat, right angle base means carried by said bars, an upper horizontal bar secured to the upper ends of said pair of bars, and bracing bars secured between said pair of bars and said upper bar.

9. A guard attachment for mounting on a tractor having a driver's seat to protect the driver against injury in the event the tractor should tip over, said attachment comprising a pair of upright bars one on each side of said seat, right angle base means carried by said bars, and a pair of horizontal bars secured to said upright bars adjacent the upper ends thereof.

10. A guard attachment for mounting on a tractor having a driver's seat to protect the driver against injury in the event the tractor should tip over, said attachment comprising a pair of upwardly and outwardly extending bars one on each side of said seat, and bracing bars fixed to said pair of bars and extending downwardly and forwardly therefrom.

11. A guard attachment for mounting on a tractor having a driver's seat to protect the driver against injury in the event the tractor should tip over, said attachment comprising a pair of upstanding members one on each side of said seat, each member being formed of a pair of upwardly and outwardly curved bars connected together at their upper and lower ends, and an upper horizontal bar fixed to the upper ends of said members.

12. A guard attachment for mounting on a tractor having a driver's seat to protect the driver against injury in the event the tractor should tip over, said attachment comprising a pair of upright bars one on each side of said seat, an inverted V-shaped connecting bar secured to the upper ends of said bars, a second pair of upright bars parallel with said first-named bars and disposed outwardly of said first-named bars, outwardly curved extensions carried by said second pair of bars, and inwardly and upwardly inclined extensions projecting from said first-named extensions, said latter named extensions being fixed at their inner ends to said first-named pair of bars.

13. A guard attachment for mounting on a tractor having a driver's seat to protect the driver against injury in the event the tractor should tip over, said attachment comprising a pair of upright bars one on each side of said seat, an upwardly arched connecting bar secured to the upper ends of each bar, a second pair of upright bars parallel with said first-named bars and disposed outwardly of said first-named bars, outwardly curved extensions carried by said second pair of bars, and inwardly and upwardly inclined extensions of projecting from said first-named extensions, said latter named extensions being fixed at their inner ends to said first-named pair of bars.

14. A guard attachment for mounting on a tractor having a driver's seat to protect the driver against injury in the event the tractor should tip over, said attachment comprising a pair of upright bars one on each side of said seat, a horizontal bar connected between the upper ends of said upright bars, a second pair of upright bars parallel with said first-named bars and disposed outwardly of said first-named bars, outwardly curved extensions carried by said second pair of bars, and inwardly and upwardly inclined extensions projecting from said first-named extensions, said latter named extensions being fixed at their inner ends to said first-named pair of bars.

15. A safety guard means for mounting on a wheeled tractor having a driver's seat adjacent the rear wheels, comprising a pair of upwardly and outwardly extending bar elements to be disposed one on each side of the seat, the upper portions of such bar elements being upwardly and outwardly curved to extend outwardly and above the head of the driver and over the rear wheels of said tractor, and means securing said bar elements on the tractor.

References Cited in the file of this patent

UNITED STATES PATENTS

| 1,200,655 | Scheidemantel | Oct. 10, 1916 |
| 1,204,144 | Ellis | Nov. 7, 1916 |
| 1,247,674 | Hankinson | Nov. 27, 1917 |
| 1,808,217 | Garson | June 2, 1931 |

FOREIGN PATENTS

| 34,052 | France | Nov. 10, 1928 |
| 603,466 | France | Sept. 21, 1925 |
| 622,899 | France | Mar. 8, 1927 |